United States Patent
Sibert et al.

(10) Patent No.: US 9,166,956 B2
(45) Date of Patent: Oct. 20, 2015

(54) PRIORITY-BASED ORDERING OF CRYPTOGRAPHIC PROCESSING IN WIRELESS COMMUNICATION APPARATUS

(75) Inventors: Hervé Sibert, Le Mans (FR); Sylviane Roullier, Le Mans (FR)

(73) Assignee: ST-Ericsson (France) SAS, Grenoble (FR)

( * ) Notice: Subject to any disclaimer, the term of this patent is extended or adjusted under 35 U.S.C. 154(b) by 0 days.

(21) Appl. No.: 13/145,489

(22) PCT Filed: Jan. 19, 2010

(86) PCT No.: PCT/EP2010/050580
§ 371 (c)(1),
(2), (4) Date: Sep. 7, 2011

(87) PCT Pub. No.: WO2010/086256
PCT Pub. Date: Aug. 5, 2010

(65) Prior Publication Data
US 2011/0311043 A1 Dec. 22, 2011

(30) Foreign Application Priority Data
Jan. 27, 2009 (FR) .................... 09 50479

(51) Int. Cl.
| | | |
|---|---|---|
| H04L 9/00 | (2006.01) | |
| H04L 29/06 | (2006.01) | |
| H04W 12/02 | (2009.01) | |
| H04W 88/02 | (2009.01) | |
| H04W 12/10 | (2009.01) | |

(52) U.S. Cl.
CPC .............. H04L 63/0428 (2013.01); H04L 9/00 (2013.01); H04L 63/04 (2013.01); H04W 12/02 (2013.01); H04L 65/607 (2013.01); H04L 65/80 (2013.01); H04W 12/10 (2013.01); H04W 88/02 (2013.01)

(58) Field of Classification Search
CPC ... H04L 63/0428; H04L 65/80; H04L 65/607; H04L 9/00; H04L 63/04; H04W 12/02; H04W 12/10; H04W 88/02
USPC .......................................................... 380/31
See application file for complete search history.

(56) References Cited

U.S. PATENT DOCUMENTS

| | | | | |
|---|---|---|---|---|
| 5,553,061 | A * | 9/1996 | Waggener et al. .......... | 250/491.1 |
| 6,188,698 | B1 * | 2/2001 | Galand et al. ................. | 370/412 |
| 6,876,747 | B1 * | 4/2005 | Faccin et al. ................. | 380/247 |
| 8,045,458 | B2 * | 10/2011 | Alperovitch et al. ......... | 370/230 |
| 8,447,718 | B2 * | 5/2013 | Norton et al. .................... | 706/47 |
| 2002/0083317 | A1 * | 6/2002 | Ohta et al. ..................... | 713/161 |
| 2003/0003896 | A1 * | 1/2003 | Klingler et al. ............... | 455/411 |

(Continued)

FOREIGN PATENT DOCUMENTS

| | | |
|---|---|---|
| JP | 2004159337 A | 6/2004 |
| WO | 9918703 A | 4/1999 |
| WO | 03053080 A | 6/2003 |

*Primary Examiner* — Matthew Smithers
(74) *Attorney, Agent, or Firm* — Coats & Bennett, PLLC

(57) ABSTRACT

Wireless communication apparatus (WAP) which comprises means of receiving data streams such as Access Stratum User Plane (AS UP), Access Stratum Control Plane (AS CP), and Non-Access Stratum Control Plane (NAS CP), each at least partly requiring a cryptographic processing operation, a cryptographic module comprising a cryptoprocessor, and management means configured to deliver at least some of the data streams to the crypto-processor according to an order of priority defined from the data types and cryptographic processing types assigned to each data stream.

14 Claims, 4 Drawing Sheets

(56) References Cited

U.S. PATENT DOCUMENTS

Figure 1:
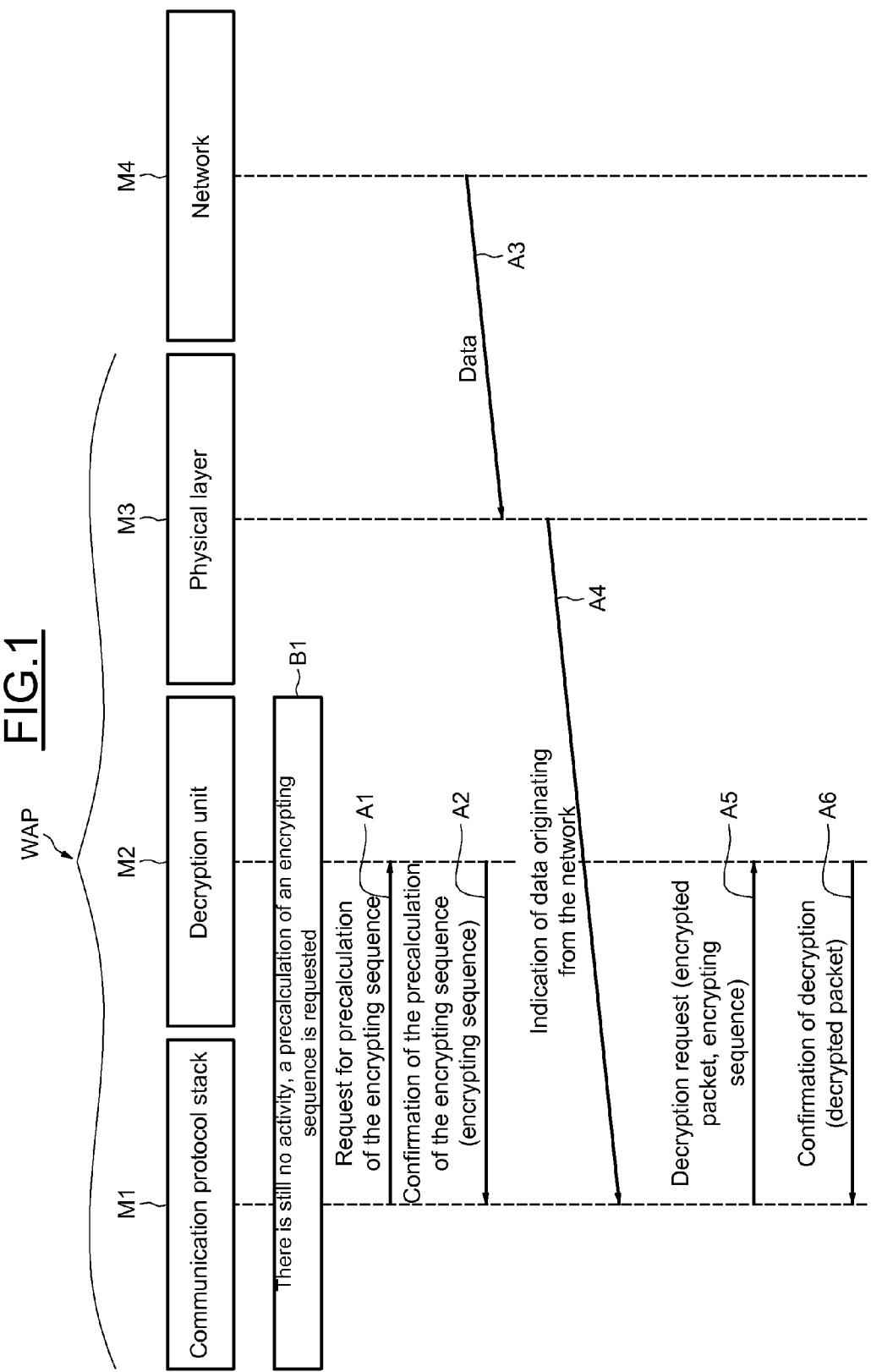

| Publication No. | Date | Inventor | Class |
|---|---|---|---|
| 2003/0156599 A1 | 8/2003 | Casaccia | |
| 2004/0141488 A1 | 7/2004 | Kim et al. | |
| 2004/0215955 A1* | 10/2004 | Tamai et al. | 713/150 |
| 2005/0013277 A1* | 1/2005 | Marque-Pucheu | 370/336 |
| 2005/0021806 A1* | 1/2005 | Richardson et al. | 709/231 |
| 2005/0201559 A1* | 9/2005 | Van Der Heijden | 380/239 |
| 2006/0112272 A1* | 5/2006 | Morioka et al. | 713/171 |
| 2006/0168338 A1* | 7/2006 | Bruegl et al. | 709/240 |
| 2006/0177050 A1 | 8/2006 | Surendran | |
| 2006/0230146 A1* | 10/2006 | Wang et al. | 709/225 |
| 2007/0053290 A1* | 3/2007 | Michels | 370/230 |
| 2007/0162981 A1* | 7/2007 | Morioka et al. | 726/30 |
| 2007/0189543 A1* | 8/2007 | Gammel et al. | 380/286 |
| 2008/0034197 A1* | 2/2008 | Engel et al. | 713/150 |
| 2012/0328102 A1* | 12/2012 | Reeds et al. | 380/259 |

* cited by examiner

PRIORITY-BASED ORDERING OF CRYPTOGRAPHIC PROCESSING IN WIRELESS COMMUNICATION APPARATUS

The invention relates to cryptographic processing operations, for example the encryption of data streams emanating from a terminal to a network and/or the decryption of data streams emanating from the network to the terminal, and notably their management within a crypto-processor of a wireless communication apparatus.

The invention applies advantageously but in a nonlimiting manner to the communication systems defined by the UMTS, 3G or LTE standards, in particular those using decryptions of sequences of encrypted packets originating from the network and requiring the calculation of an encrypting sequence or keystream for each packet for the decryption of said packet.

In the networks, encryption functions are used. They are used to ensure the confidentiality of the communication and the integrity of the messages. They require a processing operation in reception and in transmission. This processing operation induces a time during which the application or the physical layer waits, notably after reception of the packet, to have the data contained in the packet. More and more interactive services are now being proposed, and this time can prove a handicap to proposing some of these services. All the more so as, with the increase in the bit rate of the networks, the cryptographic processing time is increasingly consequential with respect to a transmission overall.

Moreover, generally all the messages in the various telecommunication streams are processed by the security layer in the order of arrival. Now, in the very high bandwidth technologies, such as the HSPDA and LTE technologies, long user messages can induce a latency that is incompatible with the time responsiveness constraints relating to the control messages. The result of this may then be a drop in service quality and consequently a drop in the effectiveness of the communication channel.

According to one implementation and embodiment, there is proposed a method of processing data streams within a wireless communication apparatus that makes it possible to improve the service quality and the effectiveness of the communication channel, in particular in the very high bandwidth technologies.

There is also notably proposed an improvement in the processing of the control streams leading to an improvement in the processing of the user streams.

According to another implementation and embodiment, there is proposed a wireless communication method and apparatus, for example a cellular mobile telephone making it possible to avoid unnecessary processing operations while reducing the power consumption, and in particular during the decryption of sequences of encrypted packets.

It is also proposed in particular to take account of the specifics of wireless communications for which the CPU time of the terminal is a rare resource and the reception of the packet is not certain.

According to one aspect, there is proposed a method of processing data streams received by a wireless communication apparatus comprising a crypto-processor, each data stream at least partly requiring a cryptographic processing operation. According to a general characteristic of this aspect, at least some of the data streams are processed within the crypto-processor according to an order of priority defined from the data types and cryptographic processing types assigned to each data stream.

Thus, for example, it is proposed to define priority criteria making it possible to process the telecommunication streams at the level of the security layer in a more effective manner.

More specifically, the messages obtained from the control streams can be processed as a priority, and it is even possible to carry out a security preprocessing operation (if possible) on these streams, while delaying the user messages.

In the case of bursts comprising numerous data items or if the processing of the crypto-processor is slowed down, the stream processing method thus makes it possible to process all the data.

For a given crypto-processor, the cryptographic processing is thus accelerated. This also allows for a drop in the temperature, consumption and inherent cost constraints for the same processing speed.

According to one implementation in which the data streams processed within the crypto-processor comprise control streams and user streams, the control streams are processed as a priority.

This thus makes it possible to prioritize the control streams over the user streams, bearing in mind that, without the control streams, the user streams are often impossible to process.

According to another implementation, at least some of the control or user streams require a preprocessing followed by a post-processing and among these control or user streams those for which the preprocessing has already been carried out are processed as a priority.

Thus, the streams for which some of the processing has already been done are preferably still priority.

According to one implementation, after having processed as a priority the control or user streams for which a preprocessing has already been carried out, the control or user streams requiring a synchronous processing operation are processed as a priority.

According to one implementation, the preprocessing is carried out in the crypto-processor and the post-processing is carried out outside the crypto-processor.

This makes it possible not to overload the crypto-processor.

According to one implementation, the control stream or the user stream comprises a sequence of encrypted packets, the preprocessing comprises, for each packet, a precalculation of an encrypting sequence and the post-processing comprises a decryption of the packet with the corresponding encrypting sequence, and the precalculation of the encrypting sequence is carried out as long as the reception quality is greater than a threshold and as long as no change-of-cell indication is received.

In other words, the measurement of the quality of the radio link, which is carried out at the level of the physical layer to activate the precalculation of an encrypting sequence only when it is actually effective, is used here. In practice, when packets are lost, the effectiveness of the precalculation of the encrypting sequence decreases.

In normal operating mode, the physical layer assesses the reception quality, for example by a determination of the bit error ratio or of the block error ratio.

The physical layer can then inform the protocol stack of a reduction in the quality of the radio link then leading to a deactivation of the precalculation of the encrypting sequence, or even a return to an acceptable reception quality leading to a reactivation of the precalculation of encrypting sequence.

Thus, precalculating one or more encrypting sequence for nothing is avoided (thus saving on consumption) when there is a risk of non-reception of certain packets or of reception of the packets in the wrong order.

Similarly, on a change of cell, that can lead to a disordered reception of the packets, the precalculation of the encrypting sequence will preferably be deactivated.

The calculation of the encrypting sequence before reception of the corresponding packet as mentioned hereinabove allows for a saving on the CPU time of the mobile terminal, the precalculation of encrypting sequence being unnecessary when it is unlikely that the corresponding packet will be received.

According to another aspect of the invention, there is proposed a wireless communication apparatus, comprising means of receiving data streams each at least partly requiring a cryptographic processing operation, a cryptographic module comprising a crypto-processor, and management means configured to deliver at least some of the data streams to the crypto-processor according to an order of priority defined from the data types and cryptographic processing types assigned to each data stream.

According to one embodiment, there is proposed a communication apparatus in which the data streams that are intended to be processed within the crypto-processor comprise control streams and user streams. The management means are configured to deliver to the crypto-processor the control streams as a priority.

According to another embodiment, there is proposed an apparatus in which at least some of the control or user streams require a preprocessing followed by a post-processing and the management means are configured to deliver to the cryptographic module, from the control or user streams, the streams for which the preprocessing has already been carried out.

According to another embodiment, there is proposed an apparatus in which the cryptographic module comprises a block external to the crypto-processor and the crypto-processor is able to carry out the preprocessing whereas the external block is able to carry out the post-processing outside the crypto-processor.

According to another embodiment, there is proposed a communication apparatus in which the management means are configured to, after having delivered by the control or user streams for which a preprocessing has already been carried out, deliver as a priority the control or user streams requiring a processing operation.

According to another embodiment, there is proposed a wireless communication apparatus in which the reception means are able to receive a sequence of encrypted packets as well as a change-of-cell indication, the cryptographic module is able to carry out, for each packet, a precalculation of an encrypting sequence and to carry out, for each packet, a decryption with the corresponding precalculated encrypting sequence, said apparatus also comprising determination means able to determine information relating to the reception quality of the packets and control means able, for each packet, to activate the cryptographic module to carry out the precalculation prior to the reception of the packet as long as the reception quality is greater than a threshold and as long as no change-of-cell indication is received.

Figure 2:
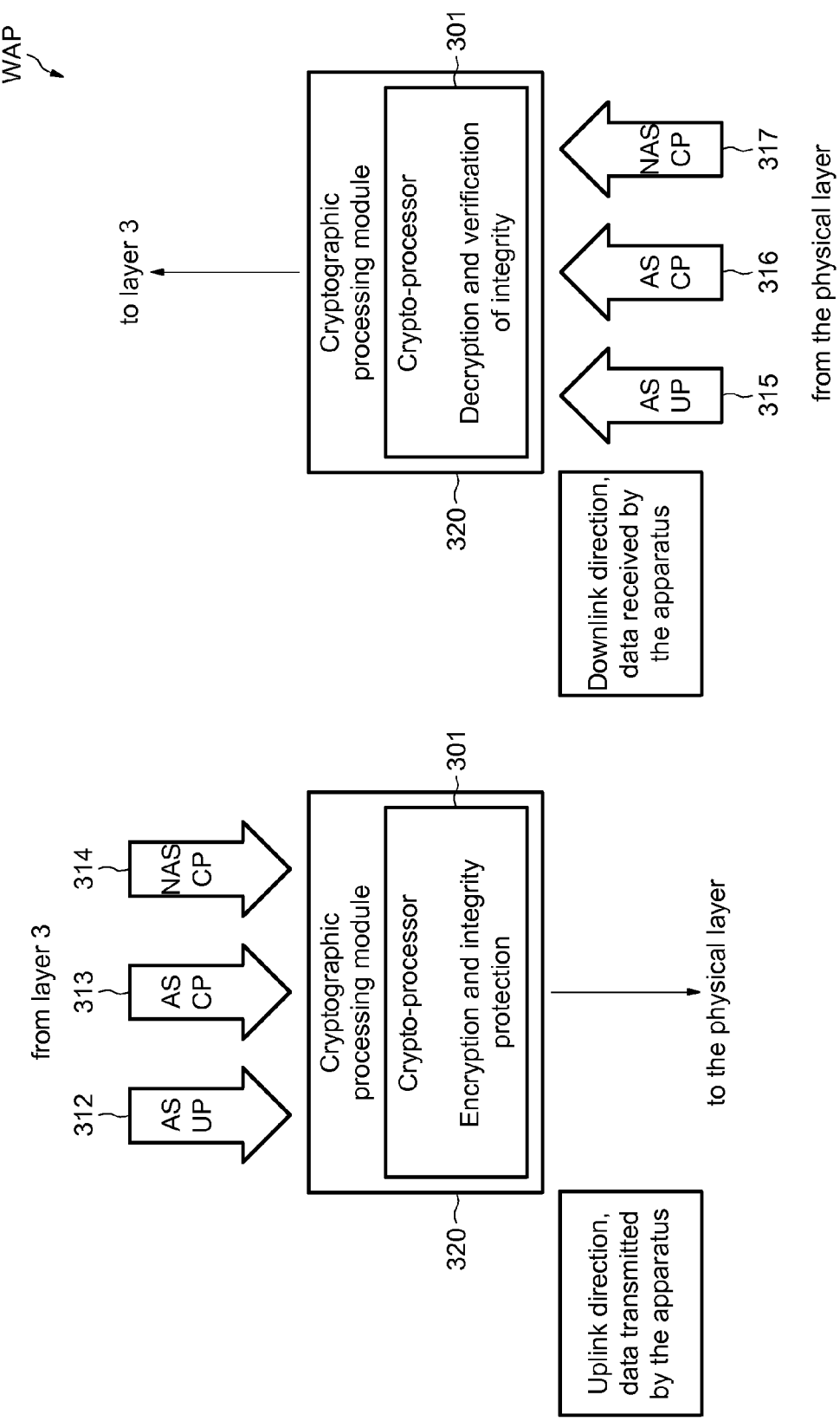
Figure 3:
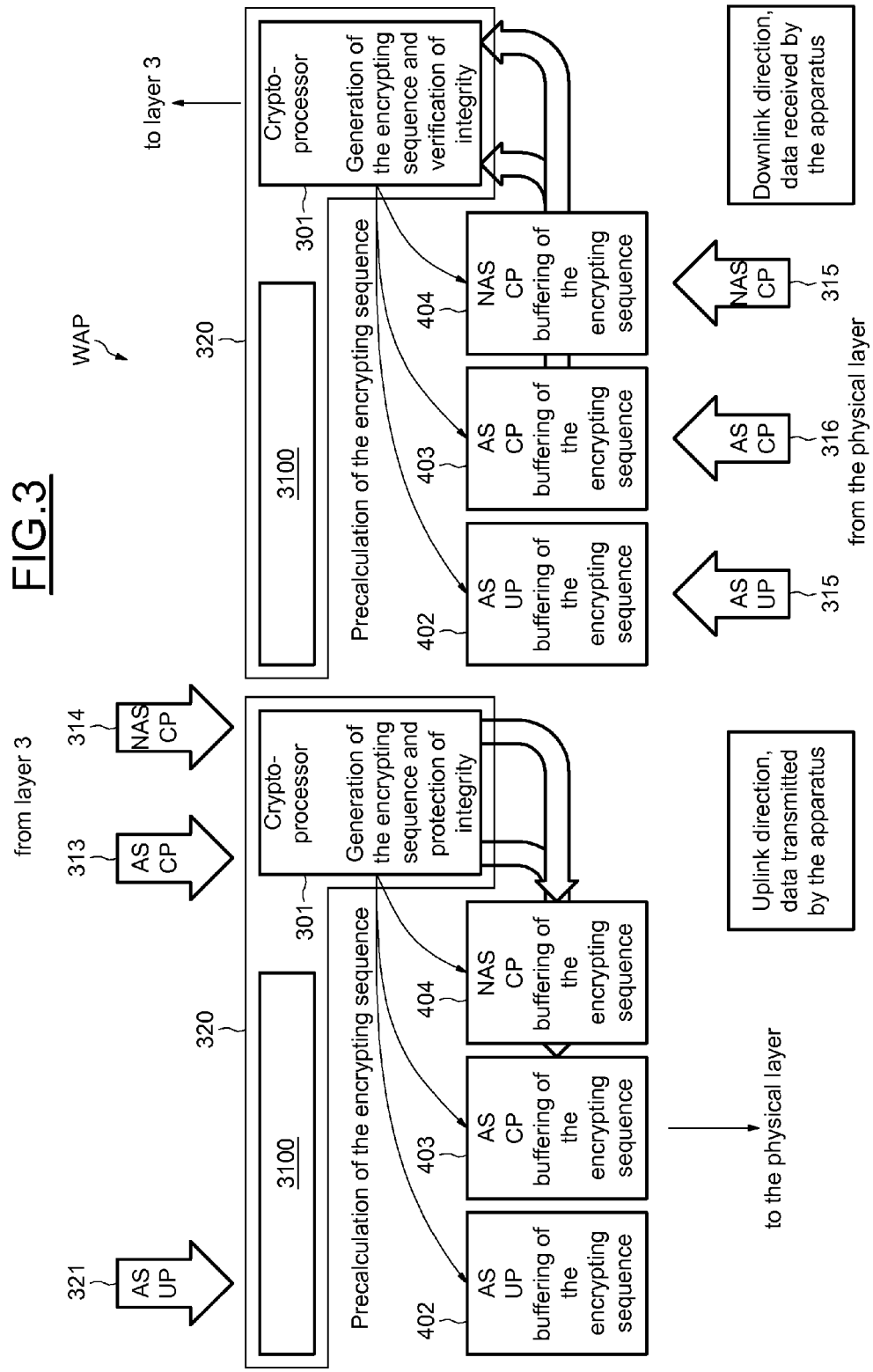
Figure 4:
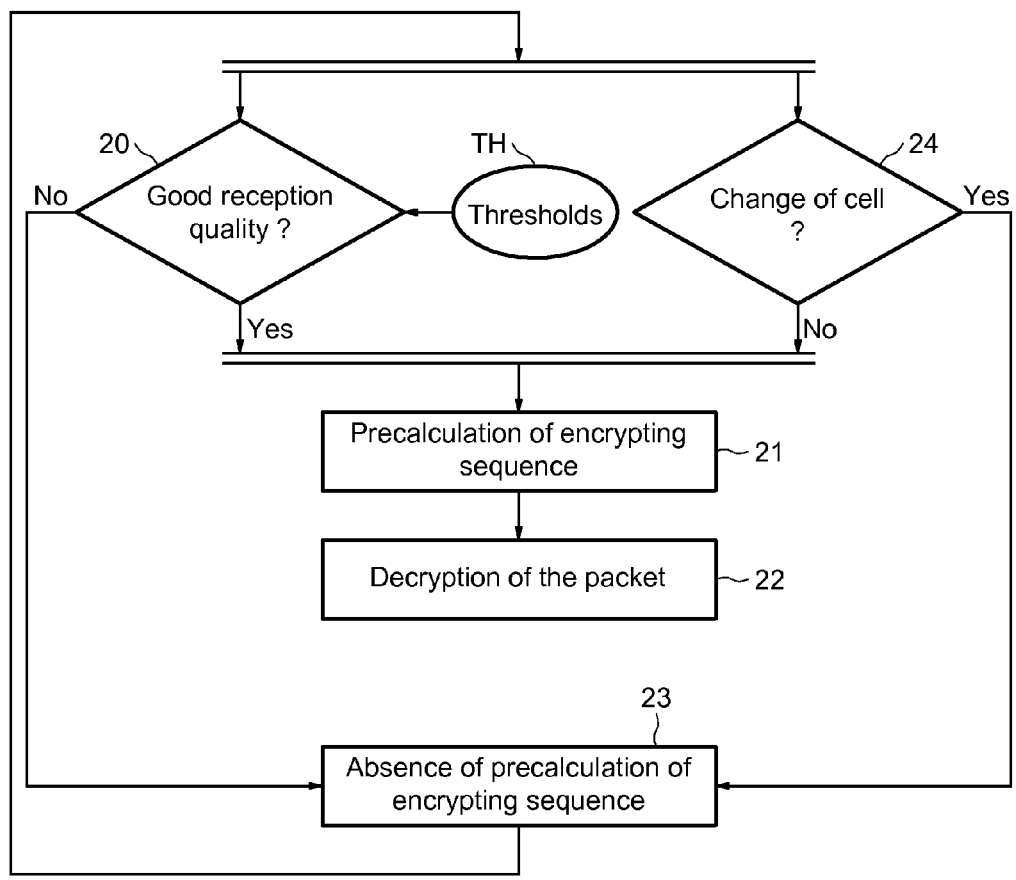

The invention will be better understood from studying the detailed description of implementations and embodiments, taken by way of nonlimiting examples, and illustrated by the appended drawings in which:

FIG. 1 diagrammatically illustrates a method of precalculating an encrypting sequence within a wireless communication apparatus according to one embodiment of the invention; and FIGS. 2 and 3 diagrammatically illustrate examples of data stream processing operations by a cryptographic module according to the invention, and, FIG. 4 illustrates another implementation of the method according to the invention.

In the mobile networks, to carry out confidentiality and/or integrity functions, the wireless terminals generally use a component called a crypto-processor. The confidentiality is provided by encrypting (in the terminal-to-network direction)/decrypting (in the network-to-terminal direction) the communication; the integrity by adding/checking an imprint added in addition to the data. This integrity is a way of assuring the recipient that the message has not been corrupted during transmission.

The integrity/integrity checking function consists, for example on the sending of the message, in generating an imprint of constant size from the message and from the key. Upon checking, the recipient generates in the same way an imprint with the message and with the key that he shares with the sender. If he obtains the same imprint then he deduces therefrom that the message has not been affected since it was sent by the sender.

For the integrity and the integrity checking, it is necessary to have at the same time the key and the message to calculate or check the imprint, so it is necessary for this processing operation to have synchronous access to the data. The operation is said to be synchronous.

In the case of encryption or decryption, the situation is not quite the same; in practice, these processing operations can be divided into two steps: the first is the calculation of an encrypting sequence and the second is an XOR operation between the encrypting sequence and the received encrypted packet.

The main characteristics of a decryption by precalculation of an encrypting sequence is briefly reviewed with reference to FIG. 1.

FIG. 1 shows four modules M1-M4 representing functional elements of a mobile network. The first three M1-M3 are situated in the WAP communication apparatus whereas the last M4 represents the whole of the network that allows for the connection of the communication apparatus.

All these modules collaborate and allow for an implementation of a precalculation of an encrypting sequence. The operation of the precalculation of an encrypting sequence is specified hereinbelow in the case, for example, of the decryption (in the terminal-to-network direction) by flow, that is to say, the decryption of a sequence of encrypted packets.

In the case of a decryption by flow, the encrypting sequence changes for each packet. It can be precalculated before reception of the packet because it does not depend on the data conveyed by the packet, but on parameters known to the decryption unit and/or the protocol stack. To be more precise, the calculation of the encrypting sequence depends on a key and an initialization vector comprising the sequence number of the packet.

This precalculation makes it possible to minimize the processing time. Thus, in the best of cases, that is to say if the precalculation is finished before the packet is received, the processing time perceived by the user for this first step is zero. All that then remains is the processing time of the second step. This requires the reception of the packet and consists in its decryption by the XOR (exclusive or) operation with the encrypting sequence.

In FIG. 1, the first module M1, named "protocol stack", represents the OSI standardized layers greater than or equal to the layer 2; these are the data link, network, transport, session, presentation and application layers that are well known to those skilled in the art.

The second module M2 named decryption unit, or more generally cryptographic module, is the unit that handles decryption within the communication apparatus, this unit works at the level of the so-called data link layer 2. By way of nonlimiting example, said unit can comprise a crypto-processor, also with a block external to the crypto-processor capable of carrying out the XOR operation.

The third module M3 named physical layer corresponds to the manner in which the bits (1 and 0) are sent over the radio link. It is, for example, made up of electronic and/or logic circuits providing the appropriate signal processing (modulation and radiofrequency stage, notably).

The fourth module M4 named network notably represents the communication channel (the radio link), a cell to which the communication apparatus is assigned, and other cells to which the communication apparatus is likely to be assigned.

Below these four modules there are represented a series of events and actions. The events are represented in block form, whereas the actions or communications are represented in the form of text above an arrow. The events and the actions are represented according to the functional entity that is involved and according to the time that elapses from top to bottom in the figure.

The first block B1 illustrates the fact that there is still no activity then that a precalculation of an encrypting sequence is requested; this case may correspond to the switching on of the communication apparatus after a shutdown or standby mode.

Below this first block B1, there is represented an action (A1) corresponding to a request for precalculation of the encrypting sequence; the precalculation request coming, for example, from the service layers is relayed to the decryption unit. This request A1 contains the sequence number of the packet for which the encrypting sequence is precalculated.

Then, the decryption unit having available to it the key and the initialization vector, calculates with the sequence number, the encrypting sequence. The decryption unit then transmits (A2) the result of this calculation to the protocol stack. This transmission is the confirmation of the calculation of the encrypting sequence and comprises the encrypting sequence. The protocol stack then stores this encrypting sequence pending the reception of the corresponding packet.

On the reception (A3) of data by the physical layer, the latter informs (A4) the protocol stack of the reception of data originating from the network; these data are also transmitted to the protocol stack during this communication.

The protocol stack requests (A5) the decryption of the packet that it has just received from the data transmitted by the physical layer. This request packet contains the encrypting sequence, previously stored, and the encrypted packet to be decrypted.

The decryption unit returns (A6) the decrypted packet to the protocol stack. The decrypted packet can then be transmitted to the service layers.

FIG. 2 illustrates the operation of the cryptographic processing module 320 within which the crypto-processor 301 is located. This cryptographic processing module is represented and described here as implemented in the WAP communication apparatus.

This figure shows the control streams AS CP, NAS CP and user streams AS UP. More specifically, these data streams are here called Access Stratum User Plane (AS UP), Access Stratum Control Plane (AS CP) and Non Access Stratum Control Plane (NAS CP) according to the terms well known to those skilled in the art.

FIG. 2 in fact illustrates two directions of operation of the crypto-processor (301) within the cryptographic processing module (320), namely on the left, the processing done before the sending of the data to the network and, on the right, the processing done after reception of data coming from the wireless network.

As can be seen, the three streams (uplink direction 312, 313, 314, downlink direction 315, 316, 317) are processed by the module (320). However, not all the streams are subjected to the same processing therein. For example, the user streams designated by UP (312, 315) are only encrypted/decrypted whereas the control streams, represented by the reference CP (313, 314, 316, 317) are encrypted/decrypted and their integrity is also protected/checked.

Therefore, provision is made to define an order of priority for the processing of the data streams within the cryptographic module 320 and in particular within the crypto-processor 301.

In fact, two priority hierarchies are shown according first of all to the type of control stream CP or user stream UP, and then according to the type of task.

It would seem advantageous to process as a priority the control streams because a minimal error may prove to be frought with consequences (for example fault in maintaining the radio link) whereas this is not the case with the user streams (example of voice streams) that are also more sensitive to latency.

More specifically, and by way of nonlimiting example, the processing priorities are indicated hereinbelow in descending order:
   Control messages that are awaiting an XOR operation with a precalculated encrypting sequence,
   Control messages that are awaiting synchronous processing,
   Precalculation of the encrypting sequence for the control messages that need only asynchronous processing,
   User messages that are awaiting an XOR operation with a precalculated encrypting sequence,
   User messages that are awaiting synchronous processing,
   Precalculation of the encrypting sequence for the user messages that need only asynchronous processing.

To manage these priorities, provision is made to add to the cryptographic module management means that can be represented materially using queues 402-404 and a control logic (FIG. 3).

As in FIG. 2, in FIG. 3 the left-hand diagram represents the processing before sending of the data whereas the right-hand one represents the processing after reception of the data. The management means make it possible to operate the crypto-processor by sending it the tasks and the streams to be processed.

When a task contained in a queue is finished, the new task to be carried out is the one from the non-empty queue that has the highest priority.

The cryptographic processing module in fact features three types of task:
   Necessary synchronous processing of the message by the crypto-processor in cases where either the encrypting sequence is not committed to memory or the processing is of integrity/integrity checking type.
   Asynchronous calculation of the encrypting sequence; and committing to memory in the queue.
   Synchronous XOR operation between the encrypting sequence and the packet to be encrypted/decrypted. This operation can be carried out in a dedicated block 3100 external to the crypto-processor 301. This makes it possible notably to relieve the load on the crypto-processor.

An example is described in detail hereinbelow to clearly show the overall operation of the crypto-processor with its management means.

The control streams AS CP and NAS CP are processed as a priority.

Furthermore, the packets of these streams for which the encrypting sequence is already precalculated and stored will be processed as a priority. These are the queue tasks 403 and 404.

These tasks require the XOR post-processing between the packets and the corresponding encrypting sequence, which post-processing can be carried out in the XOR module 3100 external to the crypto-processor.

If there is no more XOR post-processing awaiting a control stream, the encrypting sequence for the other packets to come from the control stream will then be precalculated.

And when the control streams have been processed, the user streams AS UP (queue 402) will be processed, with the decryption of the packets for which the encrypting sequence has been precalculated as a priority, followed by the precalculation of the encrypting sequence associated with the other packets.

The packets of these streams for which the encrypting sequence is not precalculated are decrypted by the crypto-processor in a single phase (calculation of the encrypting sequence and XOR operation).

If two separate tasks have equal priority, either one will be processed first, followed by the other.

The use of the precalculation of encrypting sequence allows for a significant reduction in the perceived time for the step of calculating the encrypting sequence. However, the systematic precalculation of the encrypting sequence may prove unnecessary and CPU-time-intensive in the communication apparatus. The same applies, for example, if the packet for which the encrypting sequence was intended for decryption is not ultimately received or if the packet sequence is received in disorder. One of these cases may occur if the mobile telephone is roaming and passes from one cell to another, via the "handover" procedure; or if the radio link is not of good quality.

FIG. 4 illustrates an implementation of the conditional precalculation of encrypting sequence according to the invention.

This precalculation can be conditional on the reception quality. Also, it is assumed here that the case in point is not a change of cell.

The reception quality can be determined by the bit error ratio and/or the block error ratio.

The bit error ratio "BER" (well known to those skilled in the art) and the block error ratio are calculated by the communication apparatus. They are compared (step 20) to predefined thresholds TH; as long as these thresholds are not reached, the precalculation of encrypting sequence is continued (step 21). The calculation of the BER and of the block error ratio, and the comparison with predefined thresholds are preferentially carried out by elements of the functional entity called physical layer. When the reception, initially good, becomes poor, that is to say, for example, when the calculations of the BER and of the block error ratio reveal this poor reception with a defined threshold having been exceeded, it is preferable to stop the precalculation (step 23).

This event detected by the physical layer has an associated action carried out by the physical layer indicating that the radio link is of poor quality. In other words, the physical layer after a test revealing that one of the thresholds has been exceeded relays to the protocol stack the information indicating that the quality of the radio link is poor. The control means collaborating with the protocol stack receive this information, stop the precalculation of the encrypting sequence and no longer ask the decryption unit for this precalculation. In this case, the encrypting sequence associated with an encrypted packet will be calculated when the encrypted packet is actually received.

After having been in a mode in which the precalculation is stopped, the precalculation according to the invention can resume this precalculation, when the favourable conditions are once again met, and this is relayed to the control means.

This corresponds, for example, to the indication by the physical layer to the protocol stack that the physical link is once again of good quality. The control means then interpret this information and the precalculation of the encrypting sequence is restored.

A factor other than reception quality can condition the stopping of the precalculation of the encrypting sequence.

This other factor can be, for example, a handover request ("handover" being a term well known to those skilled in the art), indicating a change-of-cell from the network to the protocol stack. The handover command is, for example, sent by the network when the communication apparatus moves from one cell to another.

The control means receiving the handover command (step 24) from the protocol stack, although receiving information indicating good quality of the radio link, cease precalculation of the encrypting sequence (step 23). The precalculation of the encrypting sequence can then resume at the end of the handover if the reception quality is good.

The control means activating or deactivating the precalculation of the encrypting sequence by interaction with the protocol stack can be produced, for example, as software or in the form of logic circuits.

What is claimed is:

1. A method of processing data streams received or to be transmitted by a wireless communication apparatus comprising a crypto-processor, each data stream at least partly requiring a cryptographic processing operation, comprising:

assigning a data type and a cryptographic processing type to each data stream, wherein cryptographic processing types include at least data streams having encrypted packets and requiring cryptographic pre-processing followed by cryptographic post-processing and data streams requiring synchronous cryptographic processing;

processing at least some of the data streams within the crypto-processor according to an order of priority defined from the assigned data types and the cryptographic processing types; and wherein the cryptographic pre-processing includes a pre-calculation of an encrypting sequence that is performed based on a reception quality of the data streams and an indication associated with a change-of-cell.

2. The method of claim 1 wherein a data type comprises a data stream being a control stream or a user stream and wherein the control streams are processed as a higher priority than the user streams.

3. The method of claim 2 wherein a cryptographic processing type comprises a data stream requiring pre-processing followed by post-processing, and wherein the data streams for which the pre-processing has already been carried out are processed as a higher priority than the data streams for which the pre-processing has yet to be carried out.

4. The method of claim 3 wherein the pre-processing is performed in the crypto-processor and the post-processing is performed outside the crypto-processor.

5. The method of claim 3 wherein:

the data stream comprises a sequence of encrypted packets;

the pre-processing comprises, for each packet, the precalculation of the encrypting sequence;

the post-processing comprises a decryption of a packet with the corresponding encrypting sequence; and wherein the pre-calculation of the encrypting sequence is performed if the reception quality is greater than a threshold and if no change-of-cell indication is received.

6. The method of claim 3 wherein a cryptographic processing type comprises a data stream requiring synchronous processing, and wherein, after having processed as a priority the data streams for which a pre-processing has already been carried out, the data streams requiring a synchronous processing are processed as a priority.

7. The method of claim 1, wherein the data type is one of a control stream and a user stream.

8. A wireless communication apparatus, comprising:
a transceiver operative to receive and transmit data streams, each at least partly requiring a cryptographic processing operation; and
a cryptographic module comprising:
a crypto-processor;
a cryptographic management circuit operative to deliver at least some of the data streams to the crypto-processor according to an order of priority defined from a data type and a cryptographic processing type assigned to each data stream, wherein cryptographic processing types include at least data streams having encrypted packets and requiring cryptographic pre-processing followed by cryptographic post-processing and data streams requiring synchronous cryptographic processing; and
wherein the cryptographic pre-processing includes a pre-calculation of an encrypting sequence that is performed based on a reception quality of the data streams and an indication associated with a change-of-cell.

9. The apparatus of claim 8 wherein a data type comprises a data stream being a control stream or a user stream, and wherein the cryptographic management circuit is further operative to deliver to the crypto-processor the control streams as a higher priority than the user streams.

10. The apparatus of claim 9 wherein a cryptographic processing type comprises a data stream requiring pre-processing followed by a post-processing and wherein the cryptographic management circuit is further operative to deliver to the cryptographic module the data streams for which the pre-processing has already been carried out, as a higher priority than the data streams for which the pre-processing has yet to be carried out.

11. The apparatus of claim 10 further comprising a processing block external to the crypto-processor, and wherein the crypto-processor is operative to perform the pre-processing and the external processing block is operative to perform the post-processing.

12. The apparatus of claim 10 wherein a cryptographic processing type comprises a data stream requiring synchronous processing, and wherein the cryptographic management circuit is further operative, after having delivered to the cryptographic module the data streams for which the pre-processing has already been performed, to deliver to the cryptographic module the data streams requiring synchronous processing, as a priority.

13. The apparatus of claim 8 wherein:
the transceiver is operative to receive a sequence of encrypted packets and the change-of-cell indication;
the cryptographic module is operative to perform, for each packet, the pre-calculation of the encrypting sequence and to perform, for each packet, a decryption using the corresponding pre-calculated encrypting sequence; and
further comprising:
circuits operative to determine information relating to the reception quality of the packets; and
a controller operative, for each packet, to activate the cryptographic module to perform the pre-calculation prior to the reception of the corresponding packet if the reception quality is greater than a threshold and if no change-of-cell indication is received.

14. The apparatus of claim 8, wherein the data type is one of a control stream and a user stream.

* * * * *